M. H. THOMS.
THREAD GAGE.
APPLICATION FILED AUG. 23, 1920.
1,394,650.
Patented Oct. 25, 1921.
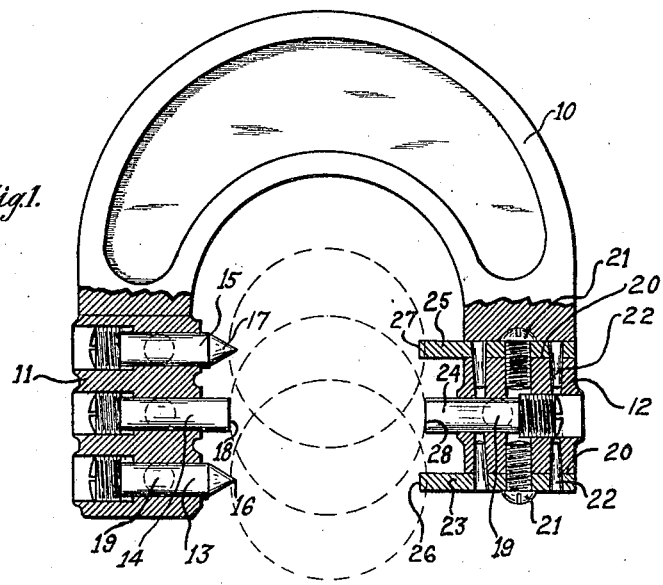
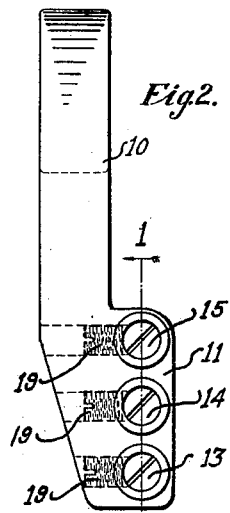
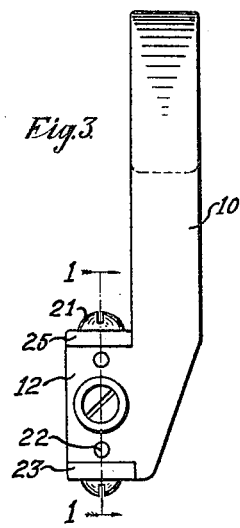
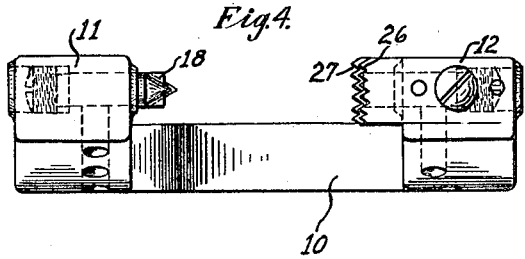
Inventor
Max H. Thoms
By Hood Schley.
Attorney

UNITED STATES PATENT OFFICE.

MAX H. THOMS, OF INDIANAPOLIS, INDIANA, ASSIGNOR TO HOWARD MARMON, OF INDIANAPOLIS, INDIANA.

THREAD-GAGE.

1,394,650. Specification of Letters Patent. Patented Oct. 25, 1921.

Application filed August 23, 1920. Serial No. 405,376.

*To all whom it may concern:*

Be it known that I, MAX H. THOMS, a citizen of the United States, residing at Indianapolis, in the county of Marion and State of Indiana, have invented a new and useful Thread-Gage, of which the following is a specification.

It is the object of my invention to provide a go and no-go thread gage, which will check all the essential dimensions of a male thread and determine just what dimension thereof, if any, is wrong.

In carrying out my invention, I provide a gage with three steps, the first two of which are go gages and the third of which is a no-go gage. I make the no-go step and one of the go steps similar but of just sufficient difference in size to correspond with the tolerance which the thread may have, and each comprising a member on one side having a plurality of teeth of the size and shape of the desired screw thread and a member on the other side comprising a single point fitting into the thread, both said members projecting into the threads to the bottom thereof; and I make the remaining go step of two flat-ended members which coöperate with the outer edges of the screw thread.

The accompanying drawing illustrates my invention: Figure 1 is a front elevation of a thread gage embodying my invention, in partial section on the lines 1—1 of Figs. 2 and 3; Fig. 2 is an elevation thereof from one side; Fig. 3 is an elevation thereof from the other side; and Fig. 4 is a plan as viewed from the open end.

The thread gage comprises a body 10, of a general horse-shoe shape, and of sufficient rigidity to avoid distortion in use. At the two ends of the horse-shoe body 10 are projections 11 and 12 lateraly offset from the plane of the body 10. These projections 11 and 12 carry the gaging parts.

In the projection 11 are mounted three screws 13, 14, and 15, passing through such projection from the outside thereof and projecting on the inside thereof. The screws 13 and 15 at their inner ends have conical points 16 and 17, the angle of which corresponds to the proper angle of the thread to be gaged; and the screw 14 at its inner end has a flat surface 18 perpendicular to the axis of the screw. The screws 13, 14, and 15 are adjustable endwise, and may be clamped in adjusted position by suitable set screws 19.

The projection 12 has two plates 23 and 25 attached to its two end faces 20 by attaching screws 21, each of these plates being properly positioned with relation to the projection 12 by two tapered dowel pins 22, and also has a screw 24 corresponding to and opposite the screw 14, save that the screw 24 is preferably screwed in as far as it can go and is not ordinarily adjustable; the screw 24 also is fastened in place by a set screw 19 similarily to the screws 13, 14, and 15. The screw 24 has an end face 28 perpendicular to its axis and parallel to the face 18. The plates 23 and 25 are opposite the pins 13 and 15 and respectively in line therewith, as seen in Fig. 1, and are provided at their inner ends with straight rows of teeth 26 and 27. The teeth of each row are spaced apart to correspond to the pitch of the thread to be gaged, and each tooth is of the same angle as said thread, so that if the thread is proper these teeth may project therein to the bottom thereof. The points 16 and 17, the teeth 26 and 27, and the flat faces 18 and 28 are all accurately made and ground.

The parts 23, 24, and 25 are normally nonadjustable, though they may be removed and other parts substituted for them to make the same gage suitable for different threads. The screws 13, 14, and 15 are longitudinally adjustable for different sizes of threads, and are also removable to allow the substitution of other parts for special threads when that is desired. The screw 14 is adjusted so that the flat faces 18 and 28 are separated by the maximum permissible outside diameter of the completed thread. The screws 13 and 15 are adjusted so that the point 16 and the teeth 26 are sufficiently far apart to allow a screw having a thread below the maximum of tolerance to pass, with such point and such teeth in the threads, and so that the point 17 and the teeth 27 are sufficiently close together not to allow a screw having a thread above the minimum of tolerance to pass, also with such point and such teeth in the threads.

With this gage thus set, the thread to be tested must pass through the first and second steps, formed by the parts 16 and 26, and 18 and 28, but must not pass the third step, formed by the parts 17 and 27. This checks the pitch diameter of the male thread part, the outside diameter of the thread, the root diameter of the thread, the angle of the thread, and the pitch of the thread. It is obvious that if the pitch of the thread is wrong, the root diameter is too small, the outside diameter is too large, the angle of the thread is wrong, or the pitch diameter is not within the tolerance limits, the screw either wil not pass through one of the first two steps or will pass through the third step.

I claim as my invention:

1. A "go" and "no-go" thread gage, comprising a body carrying a plurality of sets of gaging members, one set of gaging members comprising a pointed member and an opposed toothed member which has teeth corresponding in spacing to the pitch of the thread, said two members being spaced apart the minimum distance the tolerance of the thread permits, and another set of gaging members comprising two opposed flat-ended members spaced apart the maximum distance the tolerance of the outside diameter of the thread permits.

2. A "go" and "no-go" thread gage, comprising a body carrying two sets of gaging members each of which comprises a pointed member and an opposed toothed member which has teeth corresponding in spacing to the pitch of the thread, said two members of said two sets being respectively spaced apart the minimum distance and the maximum distance the tolerance of the thread permits.

3. A "go" and "no-go" thread gage, comprising a body carrying two sets of gaging members each of which comprises a pointed member and an opposed toothed member which has teeth corresponding in spacing to the pitch of the thread, said two members of said two sets being respectively spaced apart the minimum distance and the maximum distance the tolerance of the thread permits, said gage also having a third set of gaging members comprising two opposed flat-ended members spaced apart the maximum distance the tolerance of the outside diameter of the threads permits.

4. A "go" and "no-go" thread gage, comprising a body carrying a plurality of sets of gaging members, one set of gaging members comprising a pointed member and an opposed toothed member which has teeth corresponding in spacing to the pitch of the thread, said two members being spaced apart the minimum distance the tolerance of the thread permits, and another set of gaging members comprising two opposed flat-ended members spaced apart the maximum distance the tolerance of the outside diameter of the thread permits, one gaging member of each set being adjustable toward and from its mating member.

5. A "go" and "no-go" thread gage, comprising a body carrynig two sets of gaging members each of which comprises a pointed member and an opposed toothed member which has teeth corresponding in spacing to the pitch of the thread, said two members of said two sets being respectively spaced apart the minimum distance and the maximum distance the tolerance of the thread permits, one gaging member of each set being adjustable toward and from its mating member.

6. A "go" and "no-go" thread gage, comprising a body carrying two sets of gaging members each of which comprises a pointed member and an opposed toothed member which has teeth corresponding in spacing to the pitch of the thread, said two members of said two sets being respectively spaced apart the minimum distance and the maximum distance the tolerance of the thread permits, said gage also having a third set of gaging members comprising two opposed flat-ended members spaced apart the maximum distance the tolerance of the outside diameter of the thread permits, one gaging member of each set being adjustable toward and from its mating member.

7. A "go" and "no-go" thread gage, comprising a body carrying a set of gaging members comprising a pointed member and an opposed toothed member which has a series of teeth corresponding in space to the pitch of the thread, said two members being spaced apart to coöperate with diametrically opposite parts of the thread.

8. A "go" and "no-go" thread gage, comprising a body carrying a set of gaging members comprising a pointed member and an opposed toothed member which has a series of teeth corresponding in space to the pitch of the thread, said two members being spaced apart to coöperate with diametrically opposite parts of the thread, one of said gaging members being adjustable toward and from the other.

9. A "go" and "no-go" thread gage, comprising a body carrying a plurality of sets of gaging members, one set of gaging members comprising two opposed members which penetrate to the bottom of the thread and are spaced apart the minimum distance the tolerance of the root diameter of the thread permits, and another set of gaging members comprising two opposed members which coöperate with the outside of the thread and are spaced apart the maximum distance the tolerance of the outside diameter of the thread permits.

10. A "go" and "no-go" thread gage, comprising a body carrying a plurality of sets of gaging members, one set of gaging members comprising two opposed members which penetrate to the bottom of the thread and are spaced apart the minimum distance the tolerance of the root diameter of the thread permits, and another set of gaging members comprising two opposed members which coöperate with the outside of the thread and are spaced apart the maximum distance the tolerance of the outside diameter of the thread permits, one of each set of gaging members being adjustable.

In witness whereof, I have hereunto set my hand at Indianapolis, Indiana, this 16th day of August, A. D. one thousand nine hundred and twenty.

MAX H. THOMS.